US012468933B2

(12) United States Patent
Staneker et al.

(10) Patent No.: US 12,468,933 B2
(45) Date of Patent: Nov. 11, 2025

(54) EFFICIENT SIMULTANEOUS INFERENCE COMPUTATION FOR MULTIPLE NEURAL NETWORKS (71) Applicant: Robert Bosch GmbH, Stuttgart (DE)

(72) Inventors: Dirk Staneker, Tübingen (DE); Hans-Georg Horst, Leonberg, GA (US); Nicolai Wacker, Flein (DE); Thomas Matschke, Bietigheim-Bissingen (DE); Wolfgang Dressler, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1023 days.

(21) Appl. No.: 17/192,250

(22) Filed: Mar. 4, 2021

(65) Prior Publication Data
US 2021/0287087 A1 Sep. 16, 2021

(30) Foreign Application Priority Data
Mar. 10, 2020 (DE) .......................... 102020203047.2

(51) Int. Cl.
G06N 3/08 (2023.01)
G06N 3/045 (2023.01)
(52) U.S. Cl.
CPC .............. G06N 3/08 (2013.01); G06N 3/045 (2023.01)
(58) Field of Classification Search
CPC .......... G06N 3/08; G06N 3/045; G06N 3/048; G06N 3/061; G06N 5/04
See application file for complete search history.

(56) References Cited

U.S. PATENT DOCUMENTS

| 10,106,153 | B1 * | 10/2018 | Xiao | B62D 15/02 |
| 2018/0285727 | A1 * | 10/2018 | Baum | G06N 3/063 |
| 2020/0342285 | A1 * | 10/2020 | Croxford | G06N 3/045 |

FOREIGN PATENT DOCUMENTS

WO 2019162241 A1 8/2019

OTHER PUBLICATIONS

Choi et al, "Context-Aware Convolutional Neural Network over Distributed System in Collaborative Computing". (Year: 2019).*
Yao et al., "Eugene: Towards Deep Intelligence as a Service" (Year: 2019).*

(Continued)

Primary Examiner — Ryan C Vaughn
(74) Attorney, Agent, or Firm — NORTON ROSE FULBRIGHT US LLP (57) ABSTRACT A method for the inference computation of a plurality of neural networks on a hardware platform. Each of the neural networks comprise a plurality of neurons, which respectively aggregate inputs into a network input using a transfer function characterized by weights and process this network input into an activation using an activation function. The method includes: identifying at least one unit, which comprises one or multiple transfer functions and/or complete neurons and exists in at least two of the networks in the same form or in a form that is similar according to a predefined criterion; performing a single inference computation for the unit on the hardware platform so that the unit provides a set of outputs; processing this set of outputs in the respective networks as an output of the unit. A method for the simultaneous execution of multiple applications is also provided.

10 Claims, 4 Drawing Sheets (56) References Cited

OTHER PUBLICATIONS

Ashmore et al., "A Method for Finding Similarity between Multi-Layer Perceptrons by Forward Bipartite Alignment" (Year: 2015).*
Guan et al., "Multi-mode Study of Deep Learning Applications in Acoustic Signal Processing" (Year: 2018).*
Charpiat, et al.: "Input Similarity from the Neural Network Perspective," NeurIPS 2019, 33th Conference on Neural Information Processing Systems, Canada (2019), HAL, https://hal.archives-ouvertes.fr/hal-02394647v1, pp. 1-10.
He, et al.: "Wasserstein CNN: Learning Invariant Features for NIR-VIS Face Recognition", IEEE Transactions on Pattern Analysis and Machine Intelligence, 41(7) (2019), pp. 1761-1773.
Sarwar, et al.: "Incremental Learning in Deep Convolutional Neural Networks Using Partial Network Sharing", IEEE Access, 8 (2020), pp. 4615-4628.

* cited by examiner

EFFICIENT SIMULTANEOUS INFERENCE COMPUTATION FOR MULTIPLE NEURAL NETWORKS

CROSS REFERENCE

The present application claims the benefit under 35 U.S.C. § 119 of German Patent Application No. DE 102020203047.2 filed on Mar. 10, 2020, which is expressly incorporated herein by reference in its entirety.

FIELD

The present invention relates to the simultaneous inference computation for multiple neural networks on a common hardware platform.

BACKGROUND INFORMATION

Trained neural networks are frequently used for classification tasks, such as, for example, for the recognition of objects in images. Such neural networks have a great power of generalization. For example, following training using a sufficient number of images, which contain a specific object (such as a vehicle for example), it is possible to recognize even new variations of these objects (such as, for example, a vehicle that only entered the market after the training). Neural networks for object recognition are described in PCT Application No. WO 2019/162241 A1 for example.

In the meantime, applications comprising neural networks have also found their way into mobile devices such as smart phones for example. Thus, both in the Apple™ iOS™ ecosystem as well as in the Google™ Android™ ecosystem, the apps for managing photos are already equipped with neural networks by default, which classify the photos stored on the smart phone according to the objects they contain. It is possible, for example, to enter "motor vehicle license plate" into the search box and obtain a display of all photos containing a motor vehicle license plate.

Such inference computations require great computational expenditure, which in particular in mobile devices is at the expense of battery life.

SUMMARY

A method for inference computation of a plurality of neural networks on one hardware platform is provided in accordance with the present invention. In accordance with an example embodiment of the present invention, each of these neural networks comprises a plurality of neurons. These neurons respectively aggregate one or multiple inputs with a transfer function characterized by weights to form one network input. Subsequently, an activation function processes this network input for activating the respective neuron.

Very generally, the neural networks may be designed as classifiers for assigning observational data, such as, for example, camera images, thermal images, radar data, LIDAR data or ultrasonic data, to one or multiple classes of a given classification. These classes may represent, for example, objects or states in the observed area, which are to be detected. The observational data may originate from one or multiple sensors, for example, which are mounted on a vehicle. From the assignment to classes provided by a neural network, it is then possible, for example, to derive actions of a driving assistance system or of a system for the at least partially automated control of the vehicle, which fit the concrete traffic situation. The neural networks may be, for example, convolutional neural networks (CNN) subdivided into layers.

At least one unit is identified in the method, which comprises one or multiple transfer functions and/or complete neurons and exists in at least two of the networks in the same form or in a form that is similar according to a predefined criterion. A single inference computation is performed for this unit on the hardware platform, so that the unit provides a set of outputs. This set of outputs is processed further in the respective networks as the output of the unit.

In this manner, it is possible considerably to reduce the computing expenditure and energy consumption for simultaneously running inference computations of neural networks. Furthermore, memory space is saved as well. This is the case especially when these neural networks work with identical or similar input data or perform comparable tasks.

Thus, for example, in addition to the aforementioned standardly installed app for managing photos, additional apps are now finding their way onto smart phones, which likewise perform inference computations on image data. There are apps, for example, which can be used to search for faces of specific persons in a collection of photos or which can be used to compute on the basis of an image of a face what this face looked like in the past or what it will look like in the future.

Furthermore, in the development of complex systems for the classification of objects from images or for the classification of sounds from audio data, it is also an efficient strategy to distribute the task to multiple parallel neural networks. In particular when building up such systems successively, this makes it possible to ensure that the system can only gain with further training and that further training regarding one aspect does not have the side effect that the performance regarding another aspect deteriorates. When expanding such classification systems, this also makes it possible to avoid to the greatest possible extent that already debugged and tested program code has to be modified once again.

Thus, for example, a classification system for audio data may comprise an application specialized for voice recognition, an application specialized for recognizing sounds of gasoline engines and an application specialized for recognizing acoustic fire alarms. Here, especially the first layers, by which basic features are extracted from the audio data, may respectively work very similarly. Now, if the inference computations are performed separately for all applications, much unnecessary repeated work is performed. The method makes it possible to save a great portion of the extra expenditure. To be sure, the computer-based identification of similar units in the networks, whose inference computations may be combined, costs computing time once for every new constellation of neural networks to be simultaneously evaluated. This expenditure, however, is soon recouped by avoiding the repeated work.

It is also possible to expand the classification system with less effort for programming and training. If, for example, an expansion to recognizing the sounds of diesel engines is desired, it is possible to copy the neural network hitherto used for sounds of gasoline engines as a template, to adapt it in its architecture if necessary, and then to train it using sounds of diesel engines. In the process, the ability to recognize sounds of gasoline engines already acquired by training remains untouched since the new network for diesel engines is independent. The commonalities with the existing network for gasoline engines, however, are utilized in the context of the method so that the implementation for diesel engines and gasoline engines in separate networks incurs only little additional expenditure in comparison to a network for diesel engines and gasoline engines that is trained jointly from the start.

Whether areas in two different neural networks may expediently be identified as two occurrences of one and the same unit depends on the respective concrete application. Some examples for criteria are indicated below, which may be used in the computer-based identification of the unit individually or in combination.

For example, the predefined criterion may specify that the unit in the at least two networks receives identical or similar inputs. To what extent two sets of inputs, which are supplied to two neural networks in their respective inference computation, are to be regarded as "similar" to each other may depend in particular on the extent to which these inputs relate to the physical observation of one and the same scenery using one or multiple sensors.

In the aforementioned example, in which different types of sounds are to be recognized, all of the utilized audio data may come from the same set-up of microphones, for example. It is possible, however, to use a special microphone for recognizing fire alarms, for example, which is particularly sensitive precisely in the frequency range commonly used for fire alarms.

Likewise, images of a scenery recorded by multiple cameras, for example, may still be sufficiently "similar" to one another to allow for a combination of inference computations even if they were recorded from different perspectives.

Alternatively or additionally, the similarity of two sets of inputs may also depend on the extent to which they stem from identical, similar and/or overlapping physical sensors. Thus, for example, fundamental steps, by which primitive features are extracted from images, are similar even if an image was recorded using the front camera of a smart phone and another image was recorded using the rearward camera of this smart phone.

Alternatively or additionally, the predefined criterion may also specify that the unit in the at least two networks is characterized by identical or similar weights of the transfer functions or neurons. These weights reflect the "knowledge" of the network acquired in training. For this purpose, it is not necessary that the weights are similar in terms of their absolute value. The similarity of two sets of weights may also depend for example on the extent to which distributions formed via these sets of weights are similar to one another.

For example, a neuron in a first network may receive identically weighted inputs from all four neurons of a previous layer, while another neuron in a second network receives identically weighted inputs from all three neurons of a previous layer. In that case, the weights in the comparison of the two networks differ both in their number as well as in their numerical values. Nevertheless, there continues to exist the common pattern that inputs from all respectively available neurons of the previous layer are used and that these inputs are weighted identically among one another.

Figure 1:
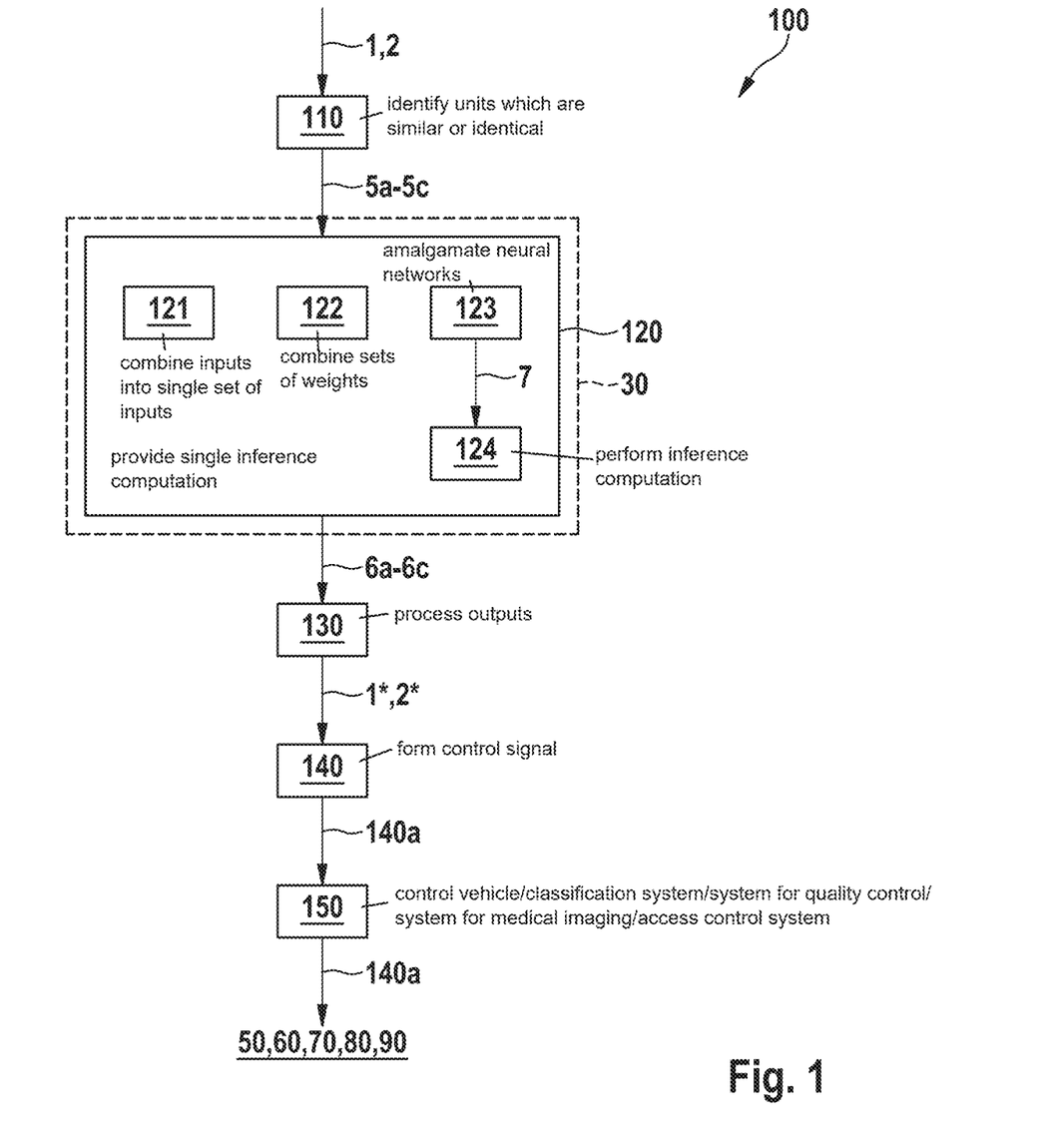
FIG. 1 shows an exemplary embodiment of method 100 for the inference computation of a plurality of neural networks 1, 2, in accordance with the present invention.

In a particularly advantageous development of the present invention, sets of inputs, which the unit receives in the respective networks, are combined into a single set of inputs. (FIG. 1, 121). In this manner, the inference computations for this unit may be still be combined into a single inference computation even when the inputs respectively used in the networks differ slightly. Thus, for example, it is possible to process the same image data in an application that uses a first neural network at a resolution of 8 bits per pixel and in a second application that uses a second neural network at a resolution of 16 bits per pixel. This difference is then no obstacle that would prevent the combination of inference computations. In neural networks, the result of the inference computation is normally to an extent insensitive to small modifications of the inputs as long as these modifications are not "adversarial examples", which were specifically constructed to provoke a false classification, for example, by optically inconspicuous modifications of the image data. How insensitive the result of the inference computation is concretely to small modifications of the inputs or even of the weights is revealed during the training of the concrete neural networks.

Analogously, in accordance with an example embodiment of the present invention, it is also possible to combine sets of weights, by which the unit is characterized in the respective networks, into a single set of weights. (FIG. 1, 122). Even if the same neural network is trained twice in succession using identical training data, this will not result in exactly the same weights. This is not to be expected already due to the fact that training is normally started from random starting values.

Combining multiple sets of inputs and/or weights into respectively one single set for inference computation may comprise for example the element-wise formation of a combined statistics, such as an average value or a median for example, across the different sets.

In a concrete constellation of neural networks to be evaluated simultaneously, one or multiple common units may be identified and their inference computations respectively combined. It is also possible for example that a first network has a unit in common with a second network, while the second network at the same time has another unit in common with a third network.

In another particularly advantageous development of the present invention, the neural networks are amalgamated into a single neural network in such a way that the unit only occurs once therein. (FIG. 1, 123). The inference computation for this amalgamated neural network is then performed on the hardware platform. (FIG. 1, 124). The amalgamation makes the architecture of the constellation of the neural networks overall more common. Moreover, with each inference computation, the expenditure for branching to the common inference computation and the transfer of the result back to the participating networks is reduced.

As explained above, in a particularly advantageous development of the present invention, the inputs of the neural networks may comprise identical or similar audio data. It is then possible to train the neural networks respectively for the classification of different sounds. As described above, a classification system for sounds may then be expanded very simply to include the recognition of further noises.

This applies analogously to another particularly advantageous development, in which the inputs of the neural networks comprise identical or similar image data, thermal image data, video data, radar data, ultrasonic data and/or LIDAR data, and in which the neural networks are respectively trained for classifying different objects. The expandability without risk of a deterioration with respect to objects already learned earlier, which was already addressed previously, is particularly important in the context of driving vehicles in road traffic in at least partially automated fashion. If multiple neural networks are evaluated in parallel, it is possible to retrofit, for example, the recognition of traffic signs newly introduced by legislative authority, without the recognition of the hitherto known traffic signs being impaired as a result. This may be an effective argument when obtaining regulatory approvals for such vehicles.

The aforementioned measurement data may be obtained by a physical measuring process, and/or by a partial or complete simulation of such a measuring process, and/or by a partial or complete simulation of a technical system observable by such a measuring process. For example, it is possible to generate photorealistic images of situations by computational tracing of light beams ("raytracing") or using neural generator networks (for example generative adversarial networks or GAN). For this purpose, it is also possible to introduce findings from the simulation of a technical system, such as positions of specific objects, for example, as auxiliary conditions. The generator network may be trained specifically to generate images that satisfy these auxiliary conditions (for example conditional GAN or cGAN).

Generally, it is possible to form a control signal from the result of the inference computation of one or multiple neural networks. It is then possible to use this control signal to control a vehicle, and/or a system for the quality control of products produced in series, and/or a system for medical imaging, and/or an access control system.

In the application on mobile devices mentioned at the outset, separate memory areas isolated against mutual access are usually assigned to different applications. This is to prevent the applications from influencing one another or to prevent a malicious application from spying on or damaging the data stocks of other applications. This security mechanism on the other hand also hinders the discovery of identical or similar units in neural networks that are executed in the applications.

The present invention therefore also relates to a further method for the simultaneous execution of multiple applications on a hardware platform. In accordance with an example embodiment of the present invention, this method starts from the fact that each application on the hardware platform is allocated a memory area that is protected against access by the other applications. Within each application, at least one inference computation is executed for at least one neural network.

Within the scope of this method, each application requests the inference computation it requires from a central worker process. In so doing, the application specifies to the worker process both the neural network to be evaluated as well as the inputs to be processed. Within the central worker process, all requested inference computations are executed using the method described above. The worker process subsequently returns the outputs of the inference computations to the respective requesting applications.

From the perspective of each application, requesting an inference computation is thus similar to the usual call for subroutines or program libraries. The worker process takes on the task of finding the suitable common units for the run time in the neural networks to be evaluated simultaneously and to combine the inference computations accordingly.

In the memory area used by the worker process, inference computations requested by various applications are executed simultaneously. However, this does not subvert or indeed entirely annul the security model according to which the applications are isolated from one another. The applications have no opportunity to execute possibly malicious binary code in this memory area. The worker process only receives the specification of the neural network and the inputs.

Further measures improving the present invention are presented in greater detail below with reference to figures together with the description of the preferred exemplary embodiments of the present invention.

DETAILED DESCRIPTION OF EXAMPLE EMBODIMENTS

FIG. 1 is a schematic flow chart of an exemplary embodiment of method 100 for the inference computation of a plurality of neural networks 1, 2. In step 110, units 5a-5c are identified, which are identical or similar in networks 1, 2. In step 120, a single inference computation is performed for these units 5a-5c on hardware platform 30 so that these units 5a-5c respectively provide outputs 6a-6c. These outputs 6a-6c are processed in step 130 in networks 1, 2 as outputs of units 5a-5c. That is to say, computation continues with outputs 6a-6c in networks 1, 2 as if the inference computation for units 5a-5c in networks 1, 2 had respectively been performed separately. This ultimately yields inference results 1*, 2* of networks 1, 2. A control signal 140a may be formed from these inference results in step 140. Using this control signal, it is then possible in step 150 to control a vehicle 50, and/or a classification system 60, and/or a system 70 for the quality control of products produced in series, and/or a system 80 for medical imaging, and/or an access control system 90.

Figure 2:
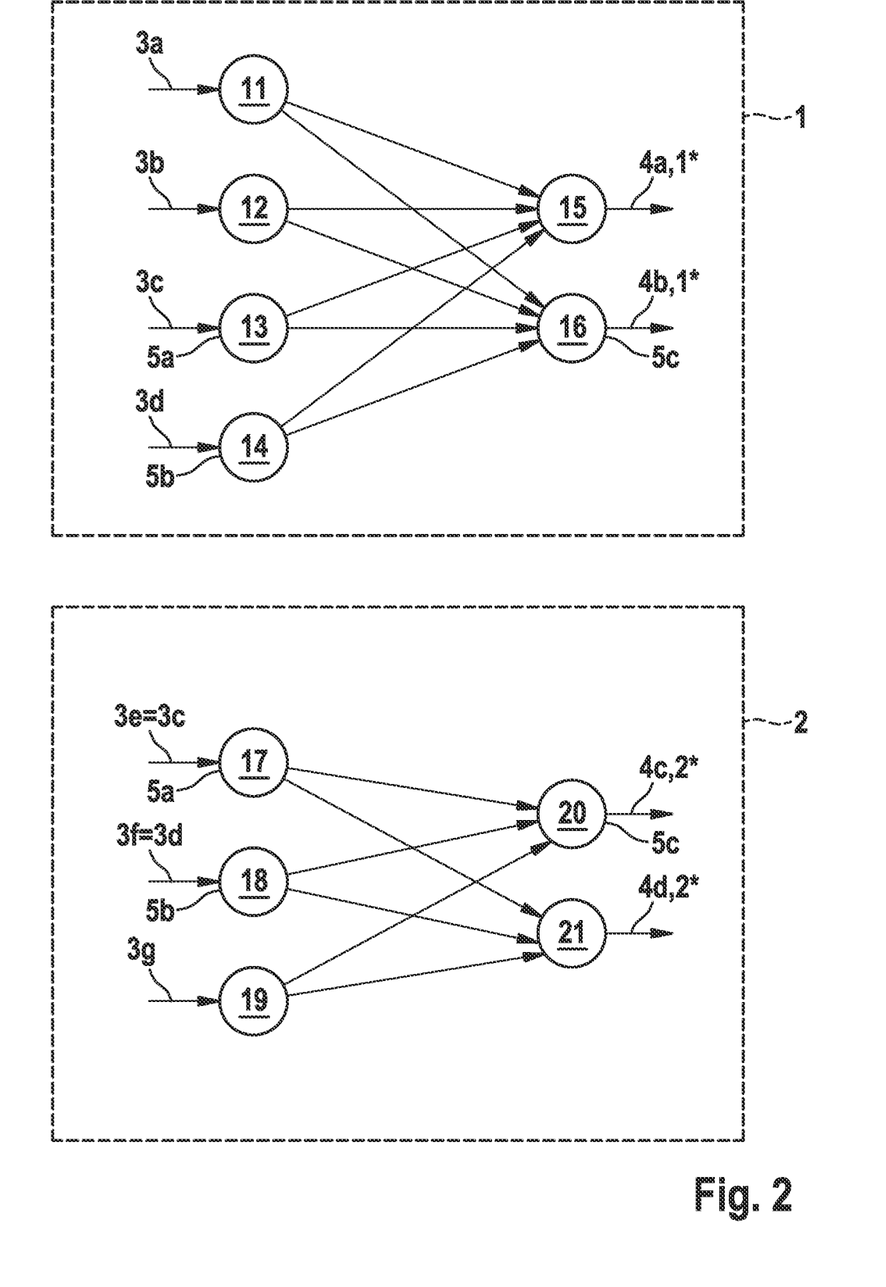
FIG. 2 shows exemplary embodiments of neural networks 1, 2 having common units 5a-5c, in accordance with the present invention.

FIG. 2 shows two exemplary neural networks 1 and 2. First network 1 is made up of neurons 11-16 and processes inputs 3a-3d into activations 4a and 4b of neurons 15 and 16, which form output 1* of network 1. Second network 2 is made up of neurons 17-21 and processes inputs 3e-3g into activations 4c and 4d of neurons 20 and 21, which form output 2* of network 2.

Since input 3e of neuron 17 is identical to input 3c of neuron 13, neurons 13 and 17 are respectively to be regarded as a unit 5a, which is similar in the two networks 1 and 2.

Since input 3f of neuron 18 is identical to input 3d of neuron 14, neurons 14 and 18 are respectively to be regarded as a unit 5b, which is similar in the two networks 1 and 2.

Furthermore, neuron 15 and neuron 20 respectively receive similar data and are therefore to be regarded as a further unit 5c, which is similar in the two networks 1 and 2.

For units 5a, 5b, 5c, the inference computation respectively needs to be performed only once.

Figure 3:
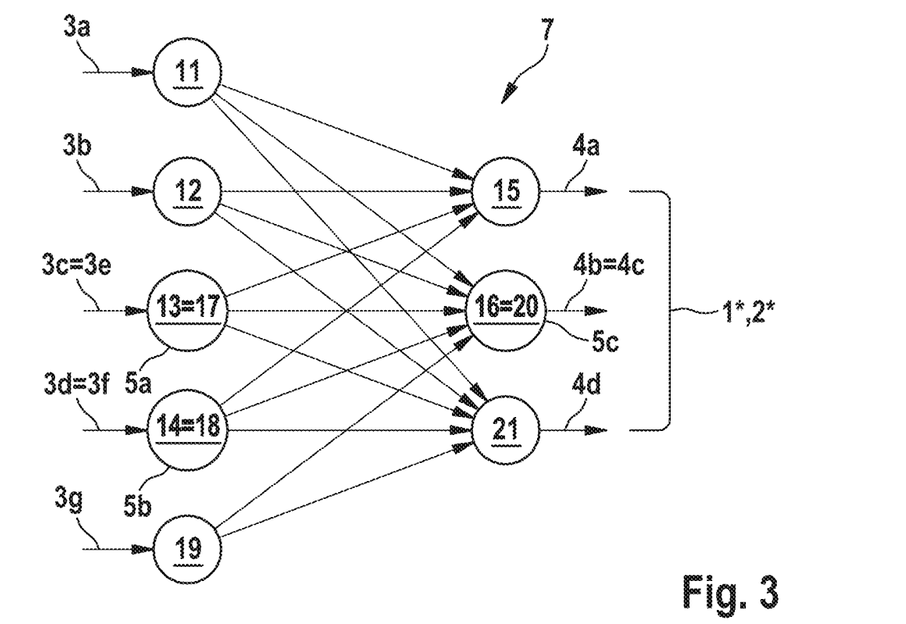
FIG. 3 shows network 7 amalgamated from the networks 1, 2 shown in FIG. 2, in accordance with an example embodiment of the present invention.

As shown in FIG. 3, the two networks 1 and 2 may be subsequently amalgamated in such a way that neurons 13 and 17, 14 and 18, and 16 and 20, respectively, are combined. For network 7 amalgamated in this way, the inference computation may be performed on hardware platform 30. This provides outputs 1* and 2* of networks 1 and 2 jointly.

Figure 4:
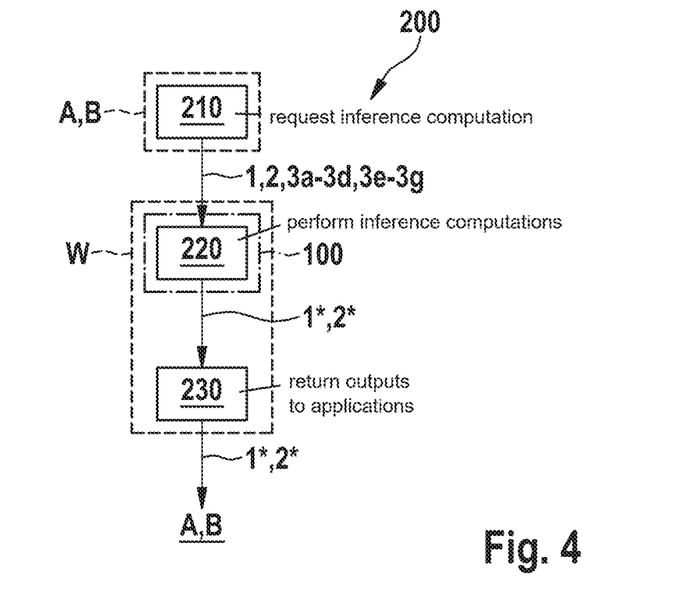
FIG. 4 shows an exemplary embodiment of method 200 for the simultaneous execution of multiple applications A, B, in accordance with the present invention.

FIG. 4 is a schematic flow chart of an exemplary embodiment of method 200 for the simultaneous execution of multiple applications A, B, which respectively require inference computations of neural networks 1, 2.

In step 210, each application A, B requests the inference computation it requires from a central worker process W, the network 1, 2 as well as the inputs 3a-3d, 3e-3g to be processed being transferred in each case. In step 220, worker process W performs the inference computations using the above-described method 100 and generates outputs 1*, 2* in the process. These outputs 1*, 2* are returned to applications A, B in step 230.

Figure 5:
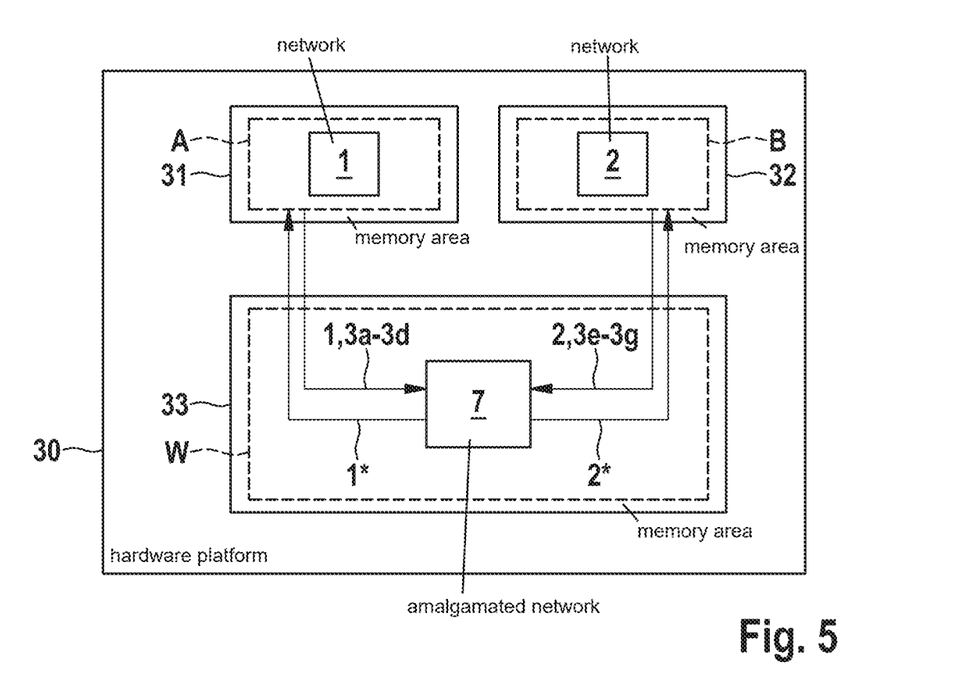
FIG. 5 shows an exemplary hardware platform 30 during the execution of method 200, in accordance with the present invention.

FIG. 5 shows an exemplary hardware platform 30 during the execution of method 200. Isolated memory areas 31 and 32 are respectively allocated to applications A and B, and memory area 33 is allocated to worker process W.

In the example shown in FIG. 5, application A requests the inference computation of the network 1 shown in FIG. 2, while at the same time application B requests the inference computation of the network 2 shown in FIG. 2. The worker process uses network 7 amalgamated from the two networks 1 and 2 and shown in FIG. 3. This amalgamated network 7 processes inputs 3a-3d of network 1 into outputs 1*, which application A is able to use as outputs of network 1. Likewise, amalgamated network 7 processes inputs 3e-3g of network 2 into outputs 2*, which application B is able to use as outputs of network 2.

What is claimed is:

1. A method for an inference computation of a plurality of neural networks on a hardware platform, each of the neural networks including a respective plurality of neurons, each of the neurons respectively aggregates inputs into a respective neural network input using a respective transfer function characterized by weights and processes the network input into an activation using an activation function, the method comprising the following steps:
   identifying a respective neuron in each respective neural network of at least two different neural networks of the networks which exists: (i) in each of the at least two different neural networks in a same form or (ii) in a form that is similar in each of the at least two different neural networks according to a predefined criterion;
   combining the identified respective neurons together to form a respective unit;
   simultaneously performing inference computations of the at least two different neural networks, including performing a single inference computation for the respective unit for all of the at least two different neural networks on the hardware platform instead of performing a separate inference computation for each of the identified respective neurons of the at least two different neural networks, the respective unit providing a result of the single interference computation to all of the at least two different neural networks as a set of outputs, and each respective neural network of the at least two different neural networks processing the set of outputs as an output of the identified respective neuron of the respective neural network, wherein the performed inference computations of each of the at least two different neural networks provides a respective inference result;
   wherein a respective input of each the at least two different neural networks originates from one or more sensors of a vehicle, the inputs include: image data and/or video data and/or radar data and/or ultrasonic data and/or LIDAR data, wherein the at least two different neural networks are respectively trained for classifying different objects, and wherein the respective inference result of each respective neural network of the at least two different neural networks includes a classification of an object detected in the respective input of the respective neural network;
   deriving an action for a driving assistance system of the vehicle or of a system for an at least partially automated control of the vehicle, based on the respective inferences results;
   forming a control signal based on the derived action; and
   controlling, using the control signal, the vehicle in an at least partially automated manner.

2. The method as recited in claim 1, wherein the predefined criterion specifies that the respective unit in each of the at least two different neural networks receives identical or similar inputs, and wherein the similarity of inputs depends on the extent to which they refer to physical observation of one and the same scene using one or multiple sensors.

3. The method as recited in claim 1, wherein the predefined criterion specifies that the respective unit in each of the at least two different neural networks receives identical or similar inputs, wherein the similarity of the inputs depends on the extent to which they stem from identical and/or overlapping physical sensors.

4. The method as recited in claim 1, wherein the predefined criterion specifies that the respective identified unit in the at least two different neural networks is characterized by identical sets of weights of the neurons.

5. The method as recited in claim 1, wherein sets of inputs, which the respective unit receives in each respective neural network of the at least two different neural networks, are combined into a single set of inputs.

6. The method as recited in claim 1, wherein sets of weights, by which the respective identified unit is characterized in each respective neural network of the at least two different neural networks, are combined into a single set of weights.

7. The method as recited in claim 1, wherein the at least two different neural networks are amalgamated into one single neural network in such a way that the respective unit occurs therein only once, and an inference computation for the amalgamated neural network is performed on the hardware platform.

8. A method for simultaneous execution of multiple applications on a hardware platform, at least one inference computation for at least one neural network being executed within each of the applications, a memory area being allocated to each application on the hardware platform, which is protected against access by other applications of the applications, comprising the following steps:
   requesting, by each application of the simultaneously executing applications, an inference computation the application requires from a central worker process by specifying a respective neural network and respective inputs to be processed;
   performing each of the inference computations within the central worker process, on the hardware platform, each of the respective neural networks including a respective plurality of neurons, each of the neurons respectively aggregates inputs into a respective neural network input using a respective transfer function characterized by weights and processes the network input into an activation using an activation function, including:
   identifying a respective neuron in each respective neural network of at least two different neural networks of the networks which exists: (i) in each of the at least two different neural networks in the same form or (ii) in a form that is similar in each of the at least two different neural networks according to a predefined criterion, combining the identified respective neurons together to form a respective unit;

simultaneously performing inference computations of the at least two different neural networks, including performing a single inference computation for the respective unit for all of the at least two different neural networks on the hardware platform instead of performing a separate inference computation each of the identified respective neurons of the at least two different neural networks, the respective unit providing a result of the single inference computation to all of the at least two different neural networks as a set of outputs, and each respective neural network of the at least two different neural networks processing the set of outputs as an output of the identified respective neuron of the respective of the respective neural network, wherein the performed inferences computations of each of the at least two different neural network provides a respective inference result, wherein a respective input of each the at least two different neural networks originates from one or more sensors of a vehicle, the inputs include: image data and/or video data and/or radar data and/or ultrasonic data and/or LIDAR data, wherein the at least two different neural networks are respectively trained for classifying different objects, and wherein the respective inference result of each respective neural network of the at least two different neural networks includes a classification of an object detected in the respective input of the respective neural network;

returning, by the worker process, the inference results to the requesting applications;

deriving an action for a driving assistance system of the vehicle or of a system for an at least partially automated control of the vehicle, based on the respective inferences results;

forming a control signal based on the derived action; and controlling, using the control signal, a vehicle in an at least partially automated manner.

9. A non-transitory machine-readable data carrier on which is stored a computer program for an inference computation of a plurality of neural networks on a hardware platform, each of the neural networks including a respective plurality of neurons, each of the neurons respectively aggregates inputs into a respective neural network input using a respective transfer function characterized by weights and processes the network input into an activation using an activation function, the computer program, when executed by one or more computers, causing the one or more computers to perform the following steps:

identifying a respective neuron in each respective neural network of at least two different neural networks of the networks which exists: (i) in each of the at least two different neural networks in a same form or (ii) in a form that is similar in each of the at least two different neural networks according to a predefined criterion;

combining the identified respective neurons together to form a respective unit;

simultaneously performing inference computations of the at least two different neural networks, including performing a single inference computation for the respective unit for all of the at least two different neural networks on the hardware platform instead of performing a separate inference computation for each of the identified respective neurons of the at least two different neural networks, the respective unit providing a result of the single inference computation to all of the at least two different neural networks as a set of outputs, and each respective neural network of the at least two different neural networks processing the set of outputs as an output of the identified respective neuron of the respective neural network, wherein the performed inference computations of each of the at least two different neural networks provides a respective inference result;

wherein a respective input of each the at least two different neural networks originates from one or more sensors of a vehicle, the inputs include: image data and/or video data and/or radar data and/or ultrasonic data and/or LIDAR data, wherein the at least two different neural networks are respectively trained for classifying different objects, and wherein the respective inference result of each respective neural network of the at least two different neural networks includes a classification of an object detected in the respective input of the respective neural network;

deriving an action for a driving assistance system of the vehicle or of a system for an at least partially automated control of the vehicle, based on the respective inferences results;

forming a control signal based on the derived action; and controlling, using the control signal, a vehicle in an at least partially automated manner.

10. A computer configured for an inference computation of a plurality of neural networks on a hardware platform, each of the neural networks including a plurality of neurons, each of the neurons respectively aggregates inputs into a network input using a transfer function characterized by weights and processes the network input into an activation using an activation function, the computer configured to:

identify a respective neuron in each respective neural network of at least two different neural networks of the networks which exists: (i) in each of the at least two different neural networks in a same form or (ii) in a form that is similar in each of the at least two different neural networks according to a predefined criterion;

combine the identified respective neurons together to form a respective unit;

simultaneously perform inference computations of the at least two different neural networks, including performing a single inference computation for the respective unit for all of the at least two different neural networks on the hardware platform instead of performing a separate inference computation for each of the identified respective neurons of the at least two different neural networks, the respective unit providing a result of the single inference computation to all of the at least two different neural networks as a set of outputs, and each respective neural network of the at least two different neural networks processing the set of outputs as an output of the identified respective neuron of the respective respective neural network, wherein the performed inference computations of each of the at least two different neural networks provides a respective inference result;

wherein a respective input of each the at least two different neural networks originates from one or more sensors of a vehicle, the inputs include: image data and/or video data and/or radar data and/or ultrasonic data and/or LIDAR data, wherein the at least two different neural networks are respectively trained for classifying different objects, and wherein the respective inference result of each respective neural network of the at least two different neural networks includes a classification of an object detected in the respective input of the respective neural network;

deriving an action for a driving assistance system of the vehicle or of a system for an at least partially automated control of the vehicle, based on the respective inferences results;

form a control signal based on the derived action; and control, using the control signal, a vehicle in an at least partially automated manner.

* * * * *